United States Patent [19]

Ichikawa

[11] Patent Number: 5,255,828
[45] Date of Patent: Oct. 26, 1993

[54] LIQUID DEVELOPER SUPPLY SYSTEM WITH PUMP FOR DISCHARGING FIXED AMOUNTS OF LIQUID DEVELOPER

[75] Inventor: Hideo Ichikawa, Numazu, Japan
[73] Assignee: Ricoh Company, Ltd., Tokyo, Japan
[21] Appl. No.: 800,490
[22] Filed: Nov. 29, 1991

[30] Foreign Application Priority Data

Nov. 30, 1990 [JP] Japan ............... 2-126475[U]
Mar. 27, 1991 [JP] Japan ............... 3-026080[U]

[51] Int. Cl.⁵ ............................................. G01F 11/02
[52] U.S. Cl. ..................................... 222/321; 222/376; 222/DIG. 1
[58] Field of Search ............... 222/321, 376, 377, 378, 222/382, 383, 385, DIG. 1

[56] References Cited

U.S. PATENT DOCUMENTS

| | | | |
|---|---|---|---|
| 351,538 | 11/1886 | Sims | 222/385 X |
| 597,477 | 1/1898 | Wine | 222/321 X |
| 774,889 | 11/1904 | Murphy | 222/377 X |
| 963,268 | 7/1910 | Becker | 222/321 |
| 1,180,221 | 4/1916 | Adams | 222/385 X |
| 1,936,526 | 11/1933 | Seidel | 222/385 X |
| 2,548,752 | 4/1951 | Titus | 222/321 X |
| 4,795,063 | 1/1989 | Sekiguchi et al. | 222/321 X |

Primary Examiner—Andres Kashnikow
Assistant Examiner—Kenneth Bomberg
Attorney, Agent, or Firm—Cooper & Dunham

[57] ABSTRACT

A pump-equipped liquid developer supply vessel is composed of a liquid developer supply vessel which holds a liquid developer therein; a cylinder with a bottom portion including a piston hole therein, a liquid developer suction hole with a liquid developer suction valve; a piston device which is slidably disposed within the cylinder, the piston device including a piston with a liquid developer inlet and a liquid developer inlet valve, a piston cover which is provided above the piston to form an inner space therebetween to hold the liquid developer therein, a piston shaft which, in a sealed state, passes through the piston hole formed in the bottom portion of the cylinder, and is integrally connected with the piston in such a manner as to slidably move the piston device along the inner side of the cylinder, when pressed upward or downward, the piston shaft including therein a developer discharge conduit which is connected to the inner space of the piston device and from which the liquid developer can be discharged for use.

2 Claims, 6 Drawing Sheets

LIQUID DEVELOPER SUPPLY SYSTEM WITH PUMP FOR DISCHARGING FIXED AMOUNTS OF LIQUID DEVELOPER

BACKGROUND OF THE INVENTION

1. Field of the Invention

The present invention relates to a liquid developer supply vessel equipped with a pump for supplying a liquid developer into a developer tank for use in a copying machine.

2. Discussion of Background

Conventionally, commonly known means for supplying a liquid developer to a developer tank in a copying machine are (1) a unit which is set into the copying machine and from which the contents are discharged by their own weight; and (2) a unit which is pre-pressurized to discharge the liquid developer into the tank.

However, there are many problems associated with such conventional liquid developer feed devices. For example, control of a fixed weight supply is very difficult using the aforementioned method (1), and a special device is required to apply a constant pressure in the method (2).

SUMMARY OF THE INVENTION

Accordingly, an object of the present invention is to provide, with due consideration to the drawbacks of such conventional devices, a pump-equipped liquid developer supply vessel for use in a copying machine, which vessel can reliably supply a fixed amount of liquid developer to a developer tank during each operation without the provision of a pressurizing means.

The above-mentioned object of the present invention can be achieved by a pump-equipped liquid developer supply vessel comprising a liquid developer supply vessel which holds a liquid developer therein, a cylinder with a bottom portion including a piston hole therein, a liquid developer suction hole with a liquid developer suction valve, disposed within the liquid developer supply vessel; a piston device which is slidably disposed within the cylinder, the piston device comprising (1) a piston with a liquid developer inlet and a liquid developer inlet valve, (2) a piston cover which is provided above the piston to form an inner space therebetween to hold the liquid developer therein, (3) a piston shaft which, in a sealed state, passes through the piston hole formed in the bottom portion of the cylinder, and is integrally connected with the piston in such a manner as to slidably move the piston device along the inner side of the cylinder, when pressed upward or downward, the piston shaft including therein a developer discharge conduit which is connected to the inner space of the piston device and from which the liquid developer can be discharged for use, the bottom portion of the cylinder and the piston being capable of forming a lower space therebetween when the piston device is moved upward to draw the liquid developer thereinto through the liquid developer suction hole with the liquid developer suction valve from the liquid developer supply vessel, the liquid developer being fed into the inner space of the piston device from the lower space between the bottom portion of the cylinder and the piston and discharged through the liquid developer conduit for use when the piston device is moved downward, and (4) an air displacement port through which air is caused to flow into the supply vessel when the liquid developer is drawn into the inner space from the supply vessel; and a spring member which urges the piston device downward.

Alternatively the above object of the present invention can be achieved by a pump-equipped liquid developer supply vessel comprising a liquid developer supply vessel which holds a liquid developer therein; a cylinder with a bottom portion including a piston hole therein a first liquid developer suction hole with a liquid developer suction valve, and a second liquid developer suction hole, disposed within the liquid developer supply vessel; a piston device which is slidably disposed within the cylinder, the piston device comprising (1) a piston with a liquid developer suction inlet and a liquid developer inlet valve, (2) a piston cover which is provided above the piston to form an inner space therebetween to hold the liquid developer therein, and an upper space above the piston cover within the cylinder to hold the liquid developer therein, the piston cover comprising a liquid developer suction inlet with a liquid developer inlet valve to draw the liquid developer into the inner space from the upper space, and a liquid developer introducing port with a valve which is connected to the second liquid developer suction hole of the cylinder, passing through the inner space, through which the liquid developer is caused to enter the upper space, (3) a piston shaft which, in a sealed state, passes through the piston hole formed in the bottom portion of the cylinder, and is integrally connected with the piston in such a manner as to slidably move the piston device along the inner side of the cylinder, when pressed upward or downward, the piston shaft including therein a developer discharge conduit which is connected to the inner space of the piston device and from which the liquid developer can be discharged for use, the bottom portion of the cylinder and the piston being capable of forming a lower space therebetween when the piston device is moved upward to draw the liquid developer thereinto through the first liquid developer suction hole with the liquid developer suction valve from the liquid developer supply vessel, the liquid developer being supplied to the inner space of the piston device from the lower space between the bottom portion of the cylinder and the piston and to the upper space through the liquid developer suction hole, and discharged from the liquid developer conduit for use when the piston device is moved downward, and (4) an air displacement port through which air is caused to flow into the supply vessel when the liquid developer is drawn into the lower space from the supply vessel, and a spring member which urges the piston device downward.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
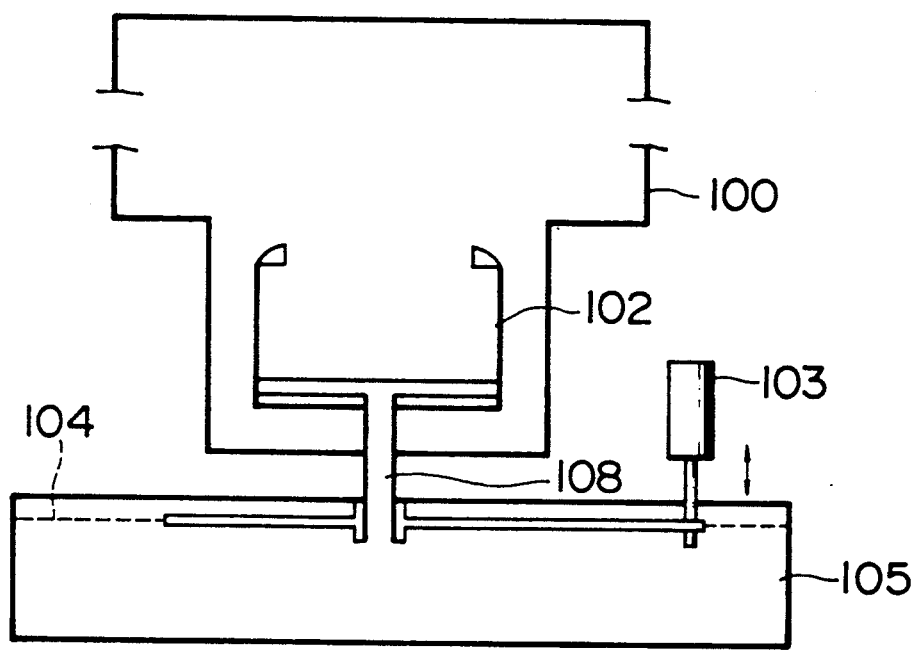
FIG. 1 is an overall view for explaining the positioning relationship between a pump-equipped liquid developer supply vessel of the present invention and a liquid developer tank for use in a copying machine.

The present invention will now be explained in detail, by referring to the drawings.

As shown in FIG. 1, when a liquid developer in a developer tank 105 in a copying machine is consumed to the point where a liquid surface 104 drops to a preset lower limit level, a liquid level detection means (not shown) emits a signal which activates a solenoid 103 for a fixed time interval. As a result, a piston shaft 108 in a pump portion 102 of a pump-equipped liquid developer supply vessel 100, linked to the solenoid 103, is pressed up.

Figure 2:
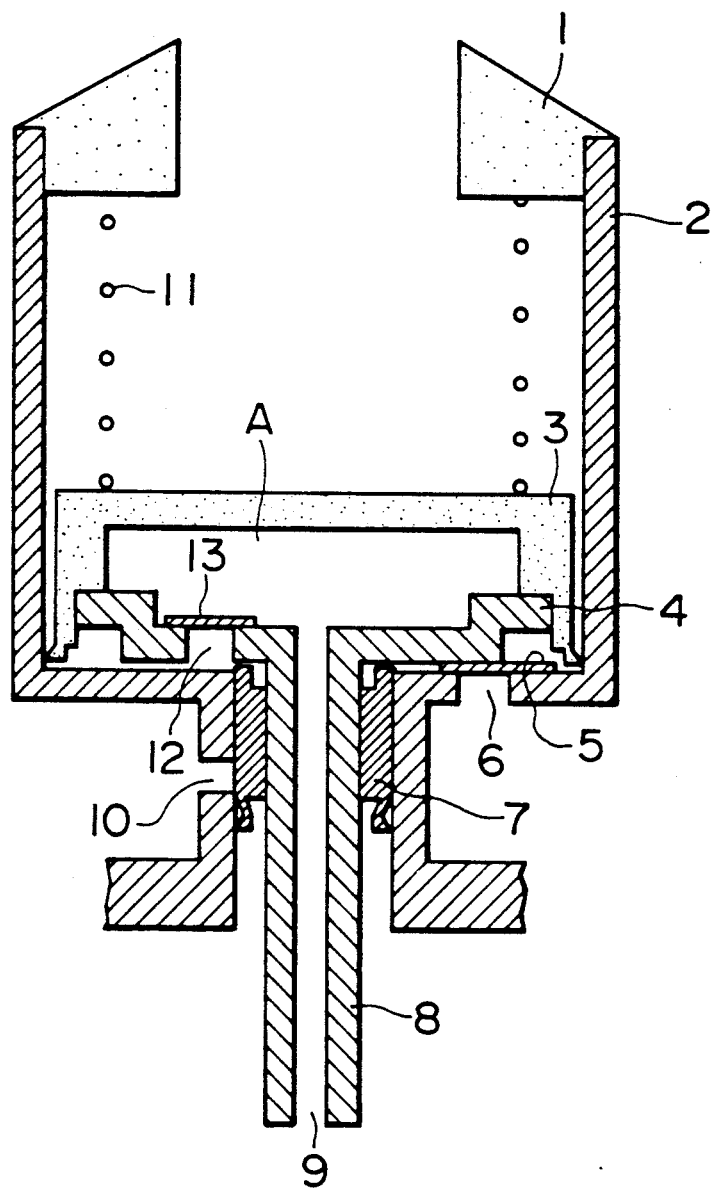
FIG. 2 is a schematic cross-sectional view of a pump portion of a pump-equipped liquid developer supply vessel according to the present invention.

FIG. 2 schematically shows an example of the pump portion of the pump-equipped liquid developer supply vessel according to the present invention.

In the pump portion shown in this figure, a piston device is slidably disposed within a cylinder 2. The piston device integrally comprises a piston cover 3, a piston 4 and a piston shaft 8. As shown in the figure, there is formed a space A between the piston cover 3 and the piston 4 into which a liquid developer (not shown) can be supplied through a liquid developer inlet 12 formed in the piston 4. The liquid developer inlet 12 is closed with a liquid developer inlet valve 13 except when the liquid developer is fed into the space A. Inside the piston shaft 8, a liquid developer discharge conduit 9 is formed, which is connected to the space A and through which the liquid developer held within the space A can be discharged for use in the copying machine.

In the bottom of the cylinder 2, a liquid developer suction hole 6 is formed, through which the liquid developer is sucked into a space C to be formed between the bottom of the cylinder 2 and the piston 4 when the piston device is moved upward as will be explained later with reference to FIG. 3. The liquid developer suction hole 6 is closed by a liquid developer suction valve 5 except when the liquid developer is sucked.

Furthermore, in the lower portion of the cylinder 2, an air displacement port 10 is formed, through which air is caused to flow into the liquid developer supply vessel 100 to allow the liquid developer held in the liquid developer supply vessel 100 to be discharged through the liquid developer discharge conduit 9 for use in the copying machine. Reference numeral 7 indicates a sealing member which seals the air displacement port 10 except when air is caused to flow into the liquid developer supply vessel 100 as mentioned above. Reference numeral 11 indicates a spring which is connected to the piston cover 3 and a spring receiving cover 11.

Figure 3:
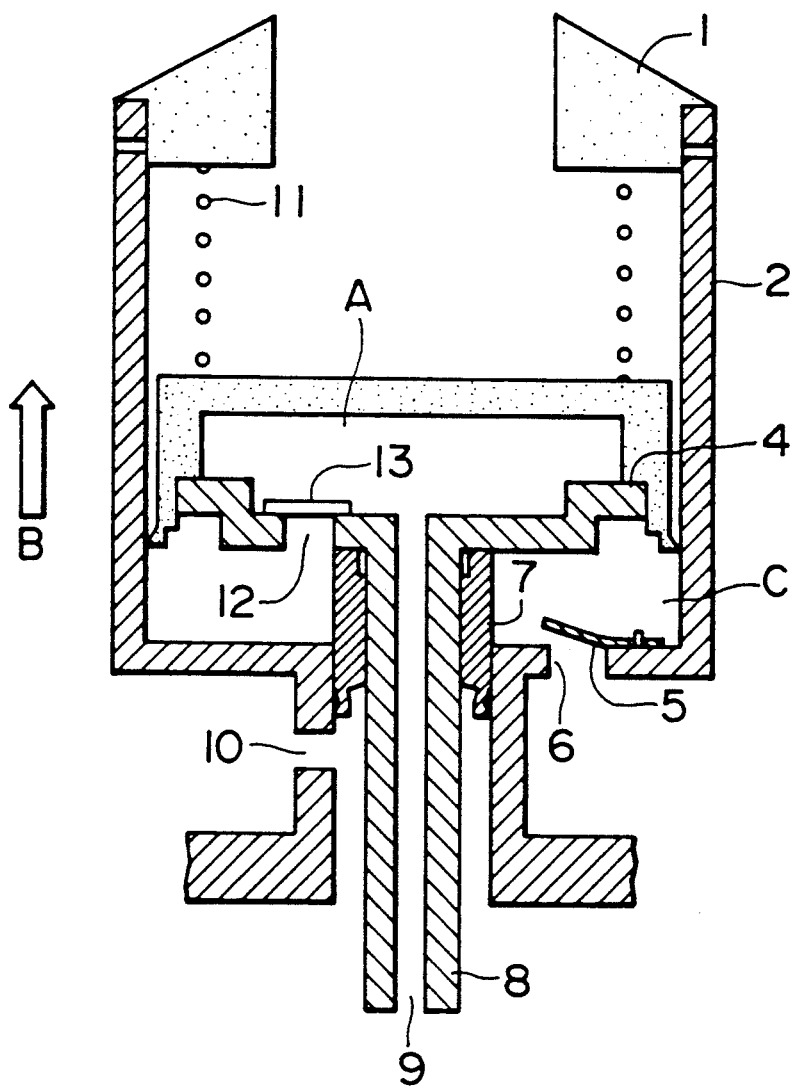
FIG. 3 is a schematic cross-sectional view of the pump portion of the pump-equipped liquid developer supply vessel shown in FIG. 2, in explanation of the operation when a piston in the pump is moved upward.

FIG. 3 illustrates the operation of the pump portion of the pump-equipped liquid developer supply vessel shown in FIG. 2 when the piston shaft 8 is pressed up for a suction operation.

In the suction operation, the piston shaft 8 linked to the above-mentioned solenoid is moved while pressing the spring 11 upward in the direction B as indicated by the arrow in FIG. 3. As the piston 4 moves upward, the space C is created in the cylinder 2, the cylinder valve 5 opens and a fixed volume of the liquid developer is drawn into the cylinder 2 through the liquid developer suction hole 6.

Figure 4:
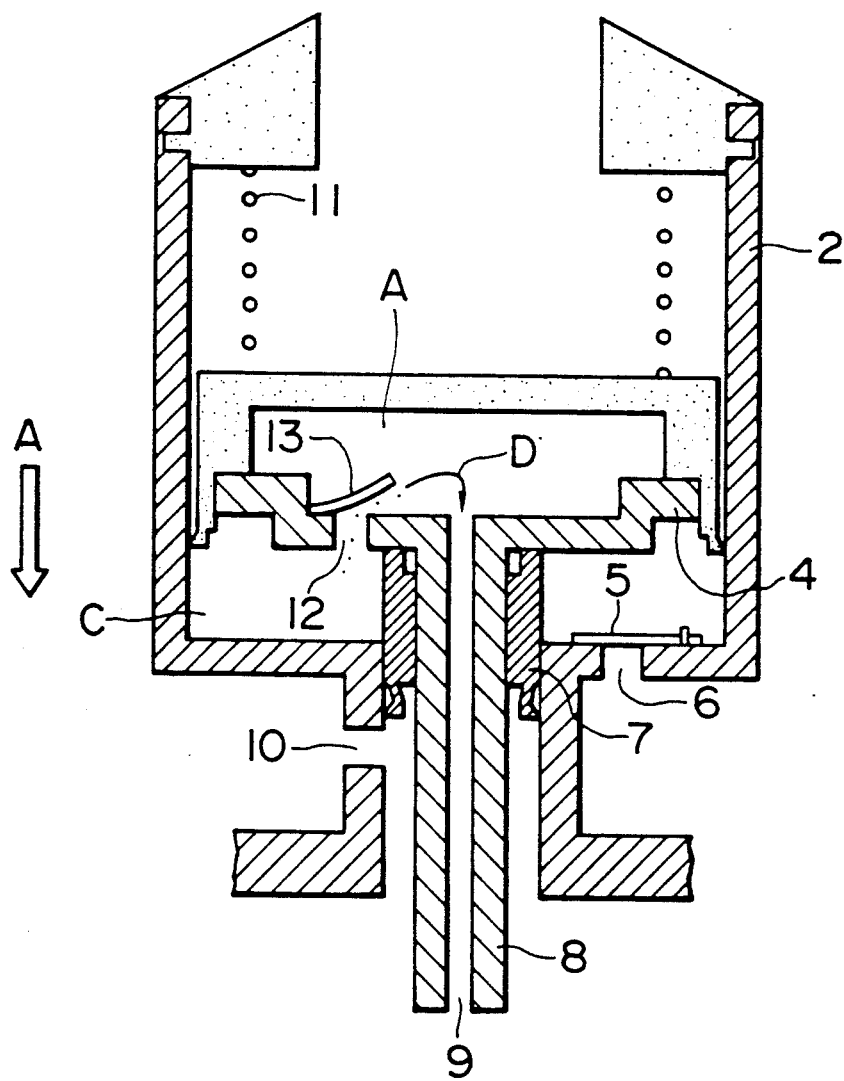
FIG. 4 is a schematic cross-sectional view of the pump portion of the pump-equipped liquid developer supply vessel shown in FIG. 2, in explanation of the operation when a piston is moved downward.

Next, after the upward movement of the piston shaft 8 has been completed, the piston 4 is moved downward in the direction of A by the spring 11 as indicated by the arrow in FIG. 4. Then, the liquid developer in the space C passes through the liquid developer inlet valve 13 and is discharged through the liquid developer inlet 12 into a developer tank (not shown) in the direction D.

At this time, it is necessary to draw air into the supply vessel 100 to take the place of the liquid developer while the liquid developer in the supply vessel is being drawn into the cylinder. In this liquid developer supply vessel of the present invention, the air displacement port 10 is opened and air flows into the supply vessel because the sealing member 7 attached to the piston shaft 8 is moved upward during the piston action in the direction of B shown in FIG. 3.

Another embodiment of the present invention will now be explained with reference to FIG. 5 and FIG. 6.

Figure 5:
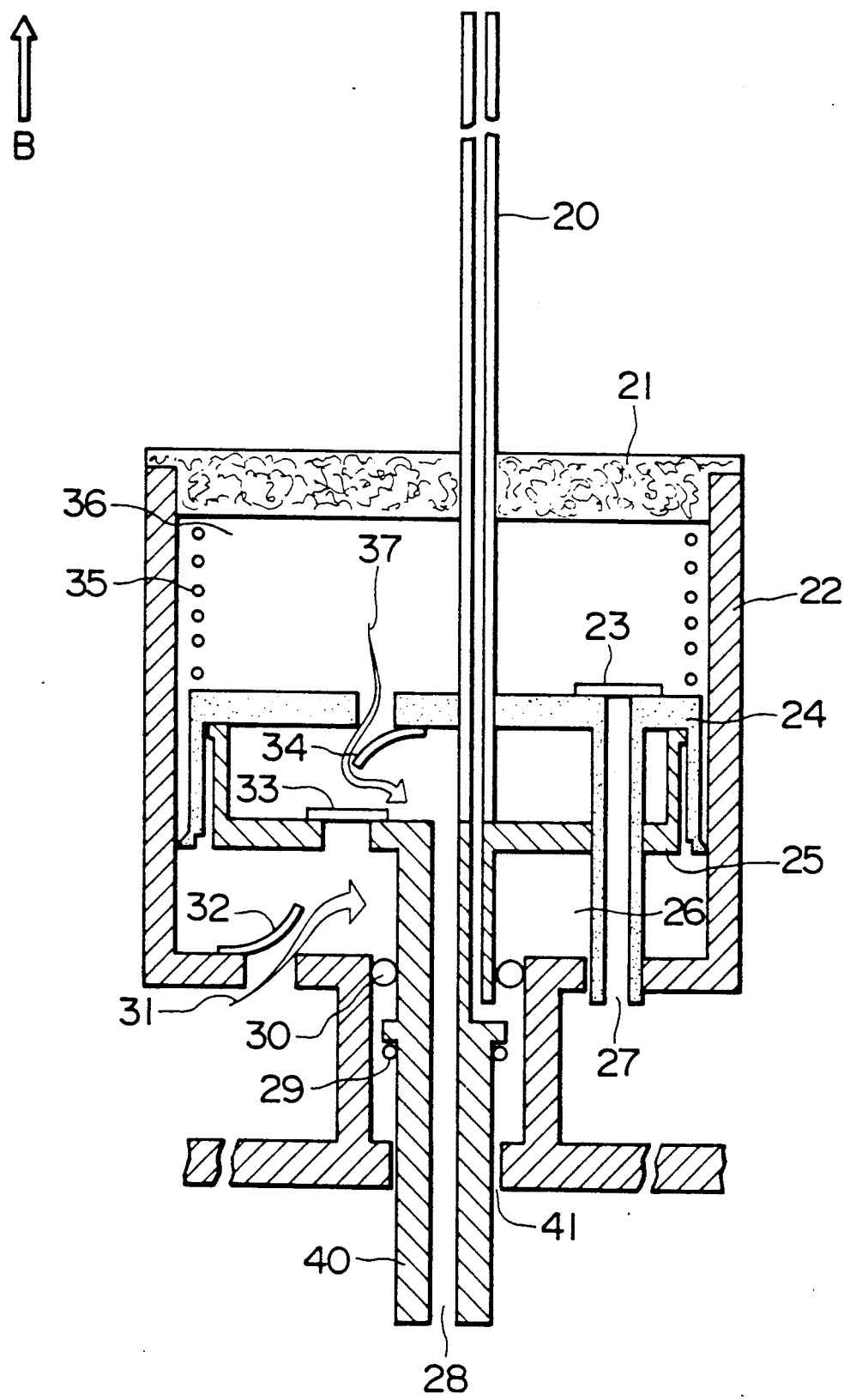
FIG. 5 is a schematic cross-sectional view of a pump portion of another pump-equipped liquid developer supply vessel according to the present invention, in explanation of the operation when a piston in the pump is moved upward.
Figure 6:
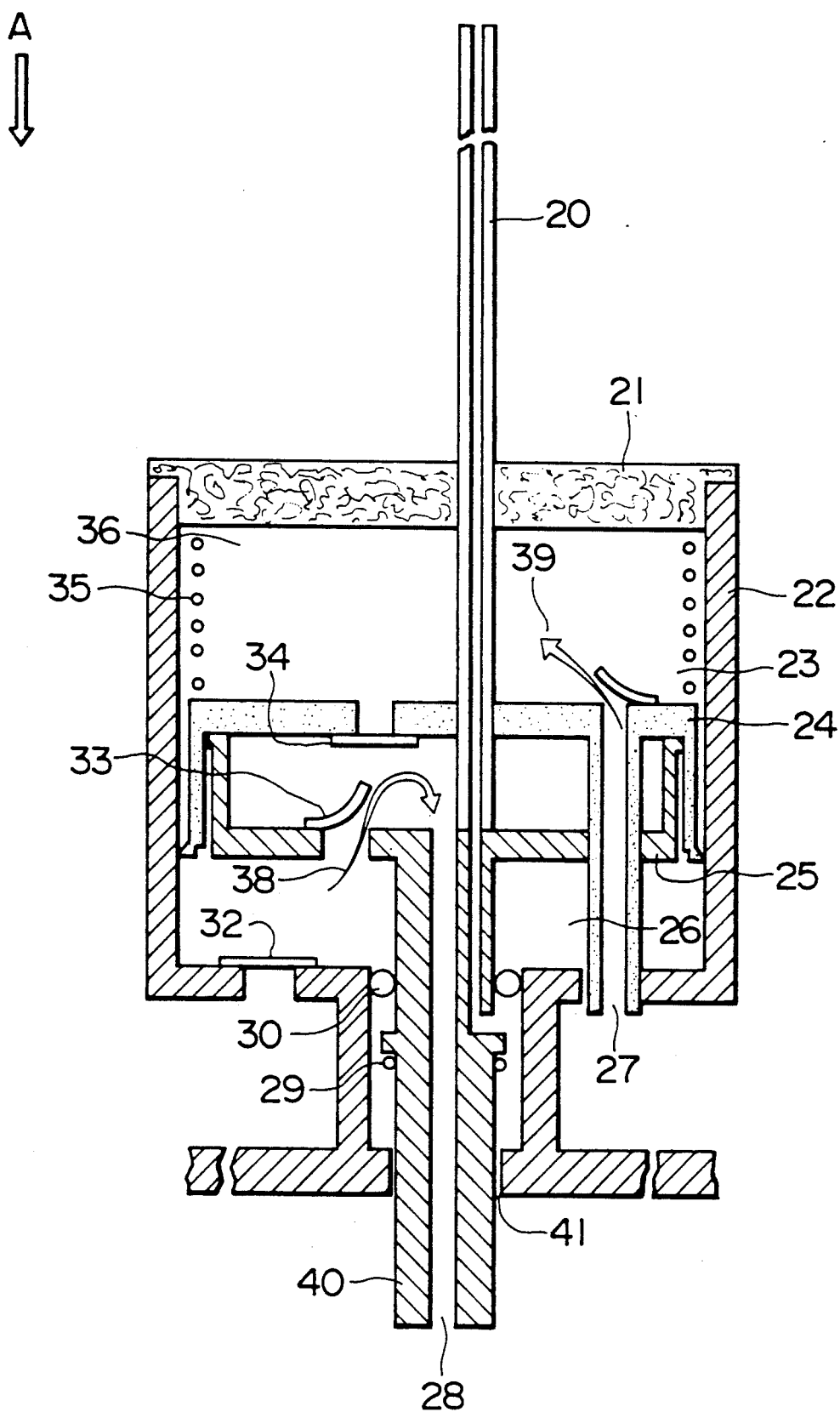
FIG. 6 is a schematic cross-sectional view of the pump portion of the pump-equipped liquid developer supply vessel shown in FIG. 5, in explanation of the operation when a piston is moved downward.

FIG. 5 and FIG. 6 are sectional views for explaining the pump portion of another embodiment of the pump-equipped liquid developer supply vessel according to the present invention. FIG. 5 and FIG. 6 show the state when the piston moves upward, and the state when the piston moves downward, respectively.

In FIG. 5 and FIG. 6, reference numeral 20 indicates an air displacement pipe; reference numeral 21, a cylinder cover through which the air displacement pipe 20 passes; reference numeral 22, a cylinder; reference numeral 23, a valve for a liquid developer introducing port; reference numeral 24, a piston cover; reference numeral 25, a piston; reference numeral 26, a lower space which corresponds to the space C in the embodiment shown in FIGS. 2 to 4; reference numeral 27, a liquid developer suction hole through which the liquid developer is sucked from a developer tank (not shown); reference numeral 40, a piston shaft; reference numeral 28, a liquid developer discharge conduit which is formed within the piston shaft 40 for discharging the liquid developer to the developer tank; reference numerals 29 and 30, sealing members; reference numeral 32, a liquid developer suction valve; reference numeral 33, a liquid developer inlet valve; reference numeral 34, a liquid developer inlet valve; reference numeral 35, a spring which urges the piston 25 downward; reference numeral 36, an upper space formed above the piston cover; reference numeral 41, an air displacement port; and reference numerals 31, 37, 38 and 39, the direction of the flow of the liquid developer.

The operation of this embodiment of the pump-equipped liquid developer supply vessel according to the present invention will now be explained with reference to FIGS. 5 and 6.

In the same manner as described for the previous embodiment in FIG. 2, when the piston shaft 40 is pushed upward in the direction B shown by the arrow by the action of a solenoid, as indicated in FIG. 5, the liquid developer suction valve 32 opens so that a fixed volume of the liquid developer in the vessel flows as indicated by the arrow 31 and is drawn into the lower space 26 in the cylinder 22. At the same time, the liquid developer inlet valve 34 is opened and the liquid developer is drawn out from the upper space 36 in the cylinder 22, passes through the liquid developer conduit 28 in the piston shaft 40, and is discharged therefrom to the liquid developer tank (not shown).

Then, after the piston shaft 40 has completed its upward movement, when the piston 25 is pressed down in the direction A from the action of the spring 35, as indicated in FIG. 6, the valve 23 opens and a fixed amount of the liquid developer is drawn into the upper space 36 in the cylinder 22, flowing in the direction indicated by the arrow 39. At the same time, the liquid developer inlet valve 33 is opened and the liquid developer is drawn out of the lower space 26 into the space A, and is discharged through the passageway in the piston shaft 40 and out of the liquid developer discharge conduit 28.

As the liquid developer is discharged from the supply vessel to the developer tank, the air in the tank is introduced into the bottom of the supply vessel through the air displacement port 41 and the air displacement pipe 20.

In the above-described embodiment shown in FIGS. 5 and 6, the liquid developer is simultaneously drawn into the pump portion of the supply vessel and discharged to the developer tank by the action of the piston in either of the directions A or B. Specifically, one reciprocating action of the piston activated by one operation of the solenoid can twice supply a fixed amount of the liquid developer to the developer tank.

It is therefore possible, by the pump-equipped liquid developer supply vessel of the present invention, to reliably supply a fixed amount of liquid developer to a developer tank during each operation, using a simple device without the provision of a pressuring means.

What is claimed is:

1. A pump-equipped liquid developer supply system comprising:

a liquid developer supply vessel which holds a liquid developer therein, a cylinder, disposed within said supply vessel, with a bottom portion having a piston hole and a liquid developer suction hole with a liquid developer suction valve, said suction hole opening into said liquid developer supply vessel, a piston device which is slidably disposed within said cylinder, said piston device comprising (1) a piston with a liquid developer inlet and a liquid developer inlet valve, (2) a piston cover which is provided above said piston to form an inner space therebetween to hold said liquid developer therein, (3) a piston shaft which, in a sealed state, passes through said piston hole formed in said bottom portion of said cylinder, and is integrally connected with said piston in such a manner as to slidably move said piston device along the inner side of said cylinder, when pressed upward or downward, said piston shaft including therein a developer discharge conduit which is connected to said inner space of said piston device and from which said liquid developer can be discharged for use, said bottom portion of said cylinder and said piston being capable of forming a lower space therebetween when said piston device is moved upward to draw said liquid developer thereinto through said liquid developer suction hole with said liquid developer suction valve from said liquid developer supply vessel, said liquid developer being fed into said inner space of said piston device from said lower space between said bottom portion of said cylinder and said piston and discharged through said liquid developer conduit for use when said piston device is moved downward, and (4) an air displacement port through which air is caused to flow into said supply vessel when said liquid developer is drawn into said lower space from said supply vessel, and a spring member which urges said piston device downward.

2. A pump-equipped liquid developer supply system comprising:

a liquid developer supply vessel which holds a liquid developer therein, a cylinder, disposed within said supply vessel, with a bottom portion having a piston hole, a first liquid developer suction hole with a liquid developer suction valve, and a second liquid developer suction hole, said first and second suction holes opening into said liquid developer supply vessel, a piston device which is slidably disposed within said cylinder, said piston device comprising (1) a piston with a liquid developer suction inlet and a liquid developer inlet valve, (2) a piston cover which is provided above said piston to form an inner space therebetween to hold said liquid developer therein, and an upper space above said piston cover within said cylinder to hold said liquid developer therein, said piston cover comprising a liquid developer suction inlet with a liquid developer inlet valve to draw said liquid developer into said inner space from said upper space, and a liquid developer introducing port with a valve which is connected to said second liquid developer suction hole of said cylinder, passing through said inner space, through which said liquid developer is caused to enter said upper space, (3) a piston shaft which, in a sealed state, passes through said piston hole formed in said bottom portion of said cylinder, and is integrally connected with said piston in such a manner as to slidably move said piston device along the inner side of said cylinder, when pressed upward or downward, said piston shaft including therein a developer discharge conduit which is connected to said inner space of said piston device and from which said liquid developer can be discharged for use, said bottom portion of said cylinder and said piston being capable of forming a lower space therebetween when said piston device is moved upward to draw said liquid developer thereinto through said first liquid developer suction hole with said liquid developer suction valve from said liquid developer supply vessel, said liquid developer being supplied to said inner space of said piston device from said lower space between said bottom portion of said cylinder and said piston and to said upper space through said second liquid developer suction hole, and discharged from said liquid developer conduit for use when said piston device is moved downward, and (4) an air displacement port through which air is caused to flow into said supply vessel when said liquid developer is drawn into said lower space from said supply vessel, and a spring member which urges said piston device downward.

* * * * *